(12) United States Patent
Aschermann

(10) Patent No.: US 12,416,314 B2
(45) Date of Patent: Sep. 16, 2025

(54) METHOD FOR THE PRODUCTION OF A SHIELDED IMPELLER, SHIELDED IMPELLER AND FAN

(71) Applicant: MAHLE INTERNATIONAL GMBH, Stuttgart (DE)

(72) Inventor: Uwe Aschermann, Karlsruhe (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 0 days.

(21) Appl. No.: 18/950,450

(22) Filed: Nov. 18, 2024

(65) Prior Publication Data
US 2025/0163929 A1 May 22, 2025

(30) Foreign Application Priority Data
Nov. 20, 2023 (DE) .......................... 102023211552.2

(51) Int. Cl.
F04D 29/32 (2006.01)
B33Y 10/00 (2015.01)
F04D 29/38 (2006.01)

(52) U.S. Cl.
CPC ............ F04D 29/329 (2013.01); B33Y 10/00 (2014.12); F04D 29/384 (2013.01)

(58) Field of Classification Search
None
See application file for complete search history.

(56) References Cited

U.S. PATENT DOCUMENTS

| 4,684,324 | A * | 8/1987 | Perosino | F04D 29/326 |
| | | | | 416/189 |
| 4,768,472 | A * | 9/1988 | Hayashi | F01P 5/06 |
| | | | | 415/173.6 |
| 7,192,253 | B2 | 3/2007 | Kammler | |
| 10,294,945 | B2 * | 5/2019 | Xu | F04D 29/164 |
| 2011/0014052 | A1 * | 1/2011 | Hoskins | F04D 29/325 |
| | | | | 416/212 R |
| 2015/0064011 | A1 * | 3/2015 | Xu | F04D 19/002 |
| | | | | 416/189 |

FOREIGN PATENT DOCUMENTS

EP 1527867 5/2005

OTHER PUBLICATIONS

English translation of Search Report issued in DE 102023211552.2 (Jul. 9, 2024).

* cited by examiner

Primary Examiner — Juan G Flores
(74) Attorney, Agent, or Firm — Barnes & Thornburg LLP

(57) ABSTRACT

A method for the production of a shielded impeller is provided,
  wherein the shielded impeller contains blades extending from a hub and a shield ring encompassing the ends of the blades that rotates with the shielded impeller,
  wherein the shield ring has radial widenings on the back edge and points without radial widenings
  wherein the shielded impeller is produced in a plastic injection molding process.
The shielded impeller can be produced quickly and inexpensively by this means.

10 Claims, 3 Drawing Sheets

METHOD FOR THE PRODUCTION OF A SHIELDED IMPELLER, SHIELDED IMPELLER AND FAN

CROSS-REFERENCE TO RELATED APPLICATIONS

Figure 1:
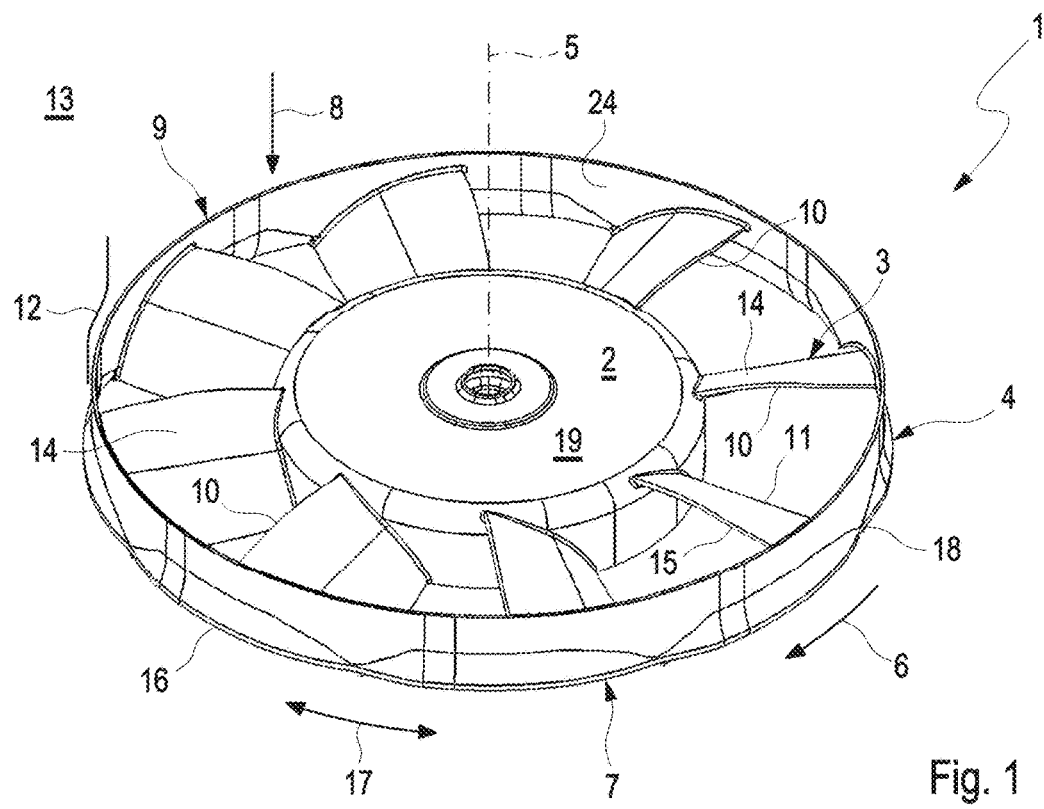

This application claims priority from German Patent Application No. DE 10 2023 211 552.2, filed on Nov. 20, 2023, the entirety of which is hereby fully incorporated by reference herein.

The present invention relates to a method for the production of a shielded impeller. The invention also relates to a shielded impeller and a fan, in particular a Visco fan in a motor vehicle that contains at least one such shielded impeller.

Fans with shielded impellers are used for a number of things in motor vehicles in particular, and have a major advantage over rotors without shields in that they are less affected by the size of the air gap between the outer diameter of the rotor and the inner diameter of an intake nozzle due to their rotating shield ring. With unshielded rotors, the efficiency decreases with larger gaps between the intake nozzle and the rotor, and they generate an unpleasant noise. When rotors are used in internal combustion engines, the gap between the rotor and the intake nozzle should be as small as possible, in order to ensure the highest possible efficiency, but large enough to avoid the risk of the rotor colliding with the intake nozzle due to vibrations. Shielded impellers therefore have significant advantages with regard to their use in internal combustion engines.

Furthermore, shielded impellers with shield rings that widen in the flow direction, i.e. from the front toward the back, have aerodynamic advantages, because this increases the flow volume, resulting in greater efficiency.

The disadvantage with these shielded impellers, in which the shield ring widens in the flow direction, is that they can only be produced with injection molding tools that have slides, which are more expensive and wear out more quickly, making the overall production process more expensive.

The problem addressed by the present invention is to therefore create a method for the production of an efficient, quiet, shielded impeller, which can be produced easily and inexpensively.

This problem is solved with the invention by the subject matter of independent claim 1. Advantageous embodiments are the subject matter of the dependent claims.

The present invention is based on the general concept of creating a method for the production of a shielded impeller in which the shape of the back of the shield ring is designed such that it can be produced with a plastic injection molding tool without slides. The shielded impeller that is to be produced contains blades on a hub surrounded by a shield ring that has radial widenings on the back edge, and points that are not widened. Where it has been widened, the shield ring has an outer diameter at the back that is greater than the outer diameter at the front. Where it is not widened, the shield ring has an outer diameter at the back that is the same as that at the front. The shield ring is therefore designed such that the entire shielded impeller can be produced as an integral part with an injection molding tool without slides. The shield ring is produced without an overhang, such that an injection molding tool without slides can be used. This is obtained in that the radial widening at the back of the shield ring for the shielded impeller is not continuous, and instead has intermittent sections that are not widened. These sections form contact points, where the rear edges of the blades come in contact with the shield ring. The use of a tool without slides results in significantly quicker output rate, increasing the overall service life thereof, due to the reduced wear. On the whole, this design of the shielded impeller, which can be produced with an injection molding tool without slides, results in a significant reduction in production costs for the shielded impeller.

The present invention is also based on the general concept of creating a shielded impeller produced with the method described above. The advantages of the above method can also be attributed to the shielded impeller obtained therewith. These advantages include a less expensive and simpler production, because there is no need for an injection molding tool with slides, resulting in lower tool costs and less wear, as well as quicker output rates, resulting on the whole in less expensive shielded impellers. Moreover, these shielded impellers, which are widened radially at the back, are more efficient, such that a greater flow volume can be obtained with the same performance level.

In an advantageous design of the shielded impeller obtained with the invention, the shield ring is cylindrical at the front. This means that the front edge of the shielded impeller can be placed in an intake nozzle, resulting in a higher flow volume and therefore greater efficiency.

In another advantageous design of the shielded impeller obtained with the invention, the outer radius of the shield ring varies at the back over its circumference. Unlike those from the prior art, in which the back edge of the shield ring is widened uniformly, and therefore cannot be produced with a tool that does not have slides, an injection molding tool without slides can be used for the production of this shielded impeller, significantly reducing production costs.

In a particularly preferred design, the blades on the shielded impeller obtained with the invention are formed integrally with the shield ring, in which the shield ring is cylindrical where it comes in contact with the front and back edges of the of each blade. This eliminates the need for an overhang on the ring where it comes in contact with the back of the blade, thus making it possible to use a tool without slides for the production thereof.

In another advantageous embodiment of the shielded impeller obtained with the invention, the back edge of the shield ring is widened over its circumference between the back edges of adjacent blades. The back edge of the shield ring is therefore radially widened between the back edges of adjacent blades over the circumference, improving the aerodynamics and efficiency of the shielded impeller obtained with the invention. By indenting the outer radius where the shield ring comes in contact with the back edges of the blades to the same size as the front edge, it is possible to eliminate the overhanging rim that would require a tool with slides.

In a particularly preferred embodiment of the shielded impeller obtained with the invention, the radial widening of the shield ring extends over no more than 50% of the axial thickness of the shielded impeller. This makes it possible to insert up to one half of the shielded impeller in a fan intake nozzle, in particular a Visco fan, i.e. a fan that is driven by a viscous clutch, resulting in a particularly efficient fan.

The hub of the shielded impeller is preferably cup-shaped. This reduces material costs and lowers the overall weight significantly, thus further reducing the production costs for the shielded impeller, and requiring a lighter bearing.

There are reinforcement structures on the inside of the hub in a particularly preferred embodiment that extend in the axial direction, i.e. in the direction of air flow, which taper toward the rim of the hub over the course of its wall. These reinforcement structures are therefore triangular, tapering over the course of the wall from the base of the hub to the rim. The hub itself can therefore have a thinner wall, thus making it lighter and requiring less material.

In another embodiment of the shielded impeller obtained with the invention, the inner surface of the shield ring is also widened at the radial widening, or cylindrical and therefore not widened. The first embodiment has the major advantage that it requires significantly less material, and can therefore be produced less expensively, and is lighter. With the second embodiment, in which the inner surface of the shield ring is cylindrical at the radial widening, i.e. having the same inner diameter at the back as at the front of the shield ring, the space between the inner surface of the shield ring and the outer surface of the widening is filled with plastic. This is less advantageous with regard to the use of materials and the overall weight, but can be obtained with a tool that does not have slides, such that a very efficient shielded impeller can be produced at relatively low costs.

The present invention is also based on the general concept of equipping a fan, in particular a Visco fan in a motor vehicle, with at least one shielded impeller obtained with one of the above approaches, in which the front edge of the shield ring is placed in an intake nozzle. The fan therefore contains a cooler and the fan described above, which has an intake nozzle connected at one end to the cooler, and the front edge of the shielded impeller obtained with the invention inserted in the other end, such that it can rotate therein. This results in a fan that is not only less expensive, but also more efficient.

Other important features and advantages of the invention can be derived from the dependent claims, the drawings, and the descriptions of the drawings.

The features specified above and described below can be used not only in the given combinations, but also in and of themselves, or in other combinations, without abandoning the scope of the invention. Components of a superordinate unit, such as a mechanism, device, or assembly, that are referred to separately, can form separate components of this unit, or be an integral part or section thereof, even if the drawings indicate otherwise.

Preferred exemplary embodiments of the invention are shown in the drawings and shall be explained in greater detail below, in which the same reference symbols refer to identical, similar, or functionally identical, components.

Figure 2:
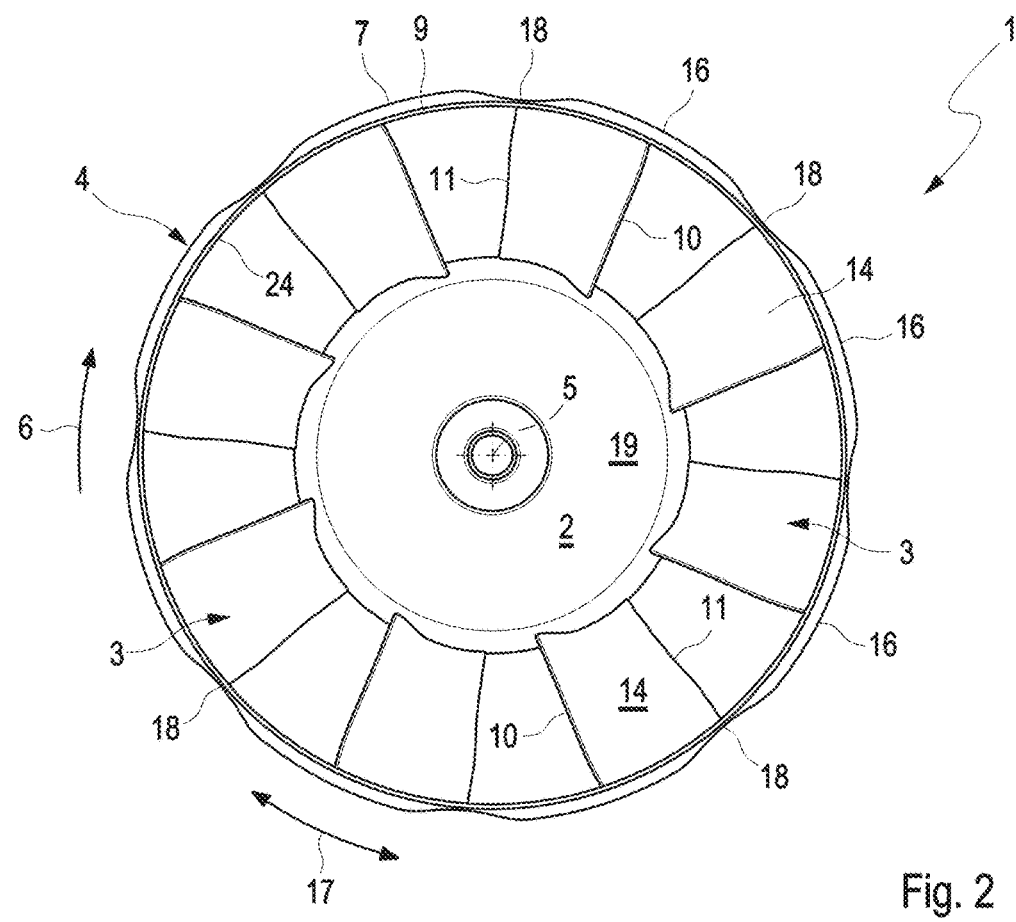
Figure 3:
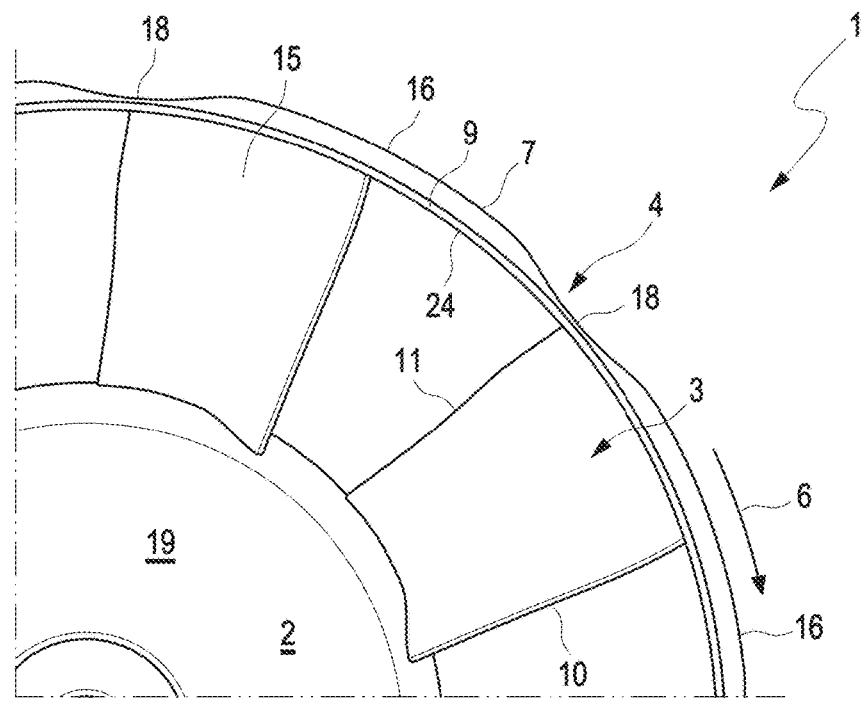
Figure 4:
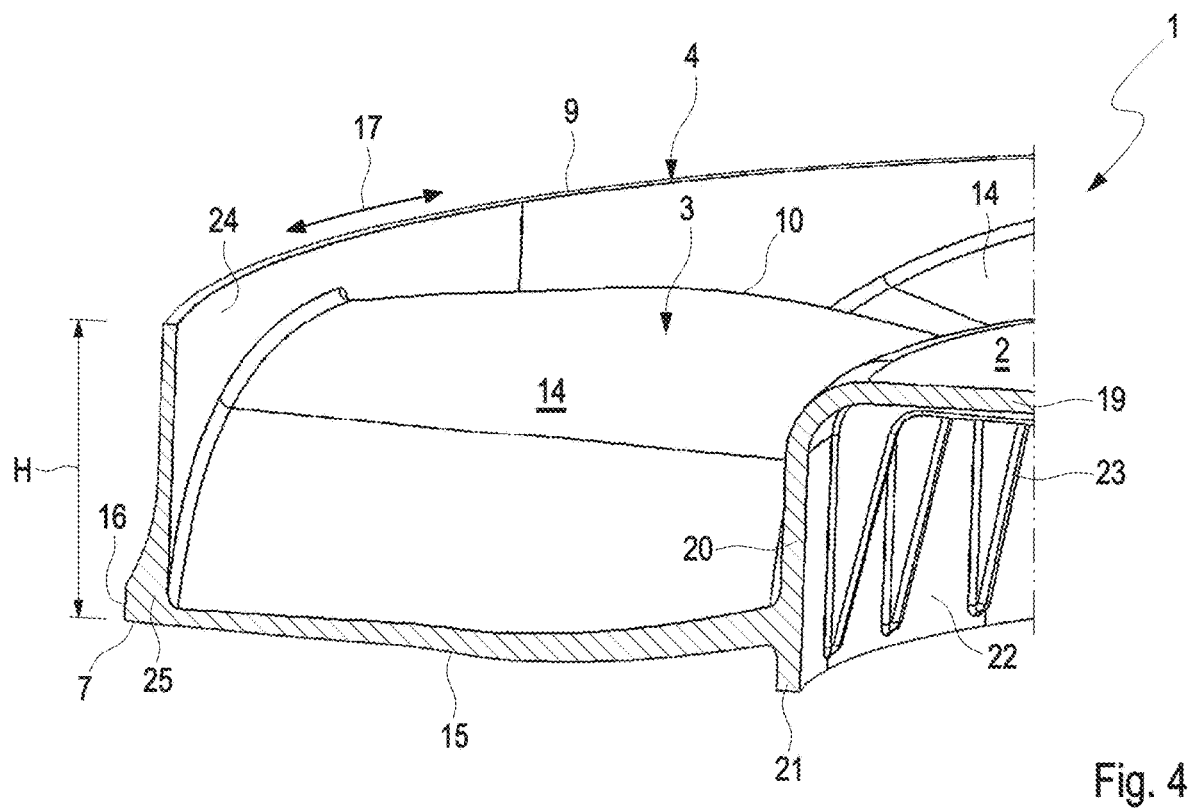
Figure 5:
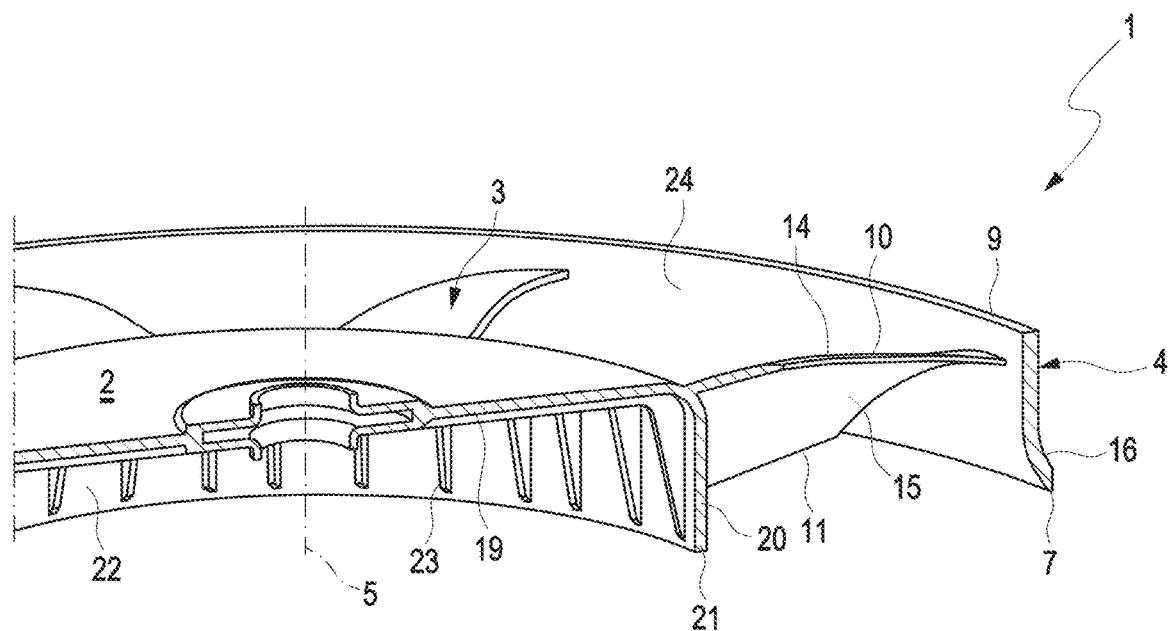
Figure 6:
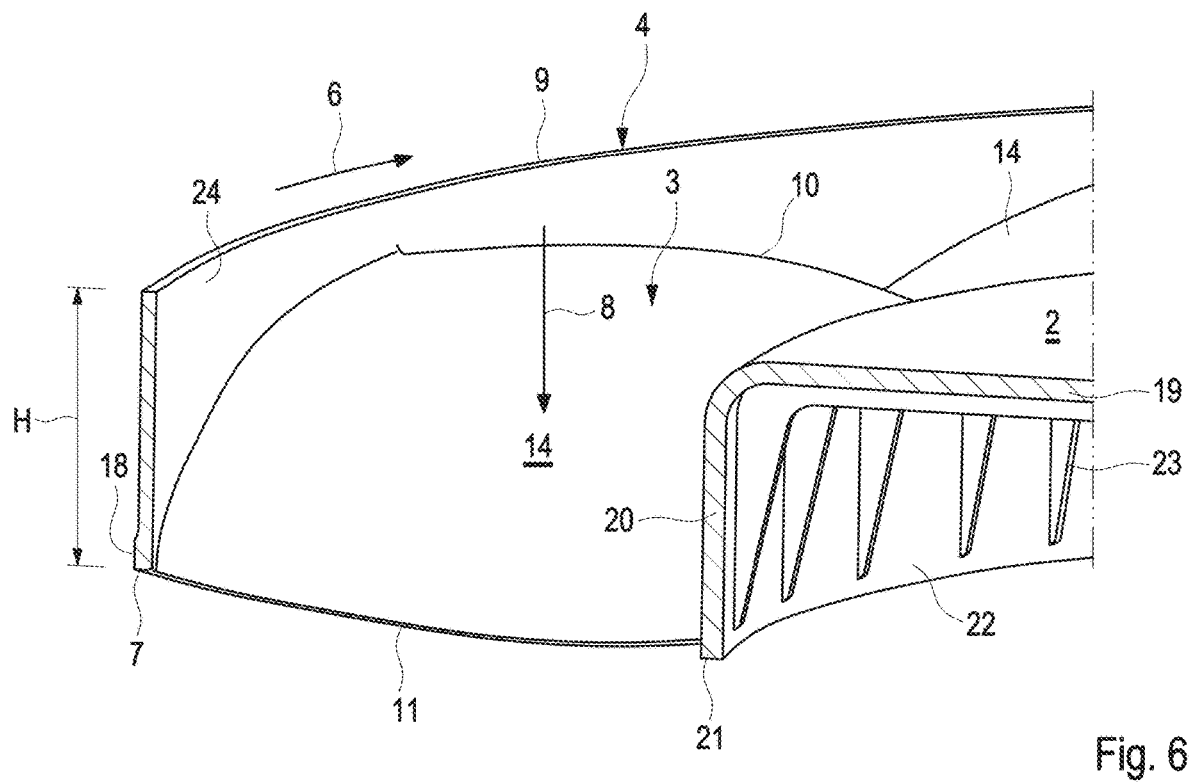

Therein, schematically:

FIG. 1 shows a shielded impeller obtained with the invention from a diagonal perspective, FIG. 2 shows a shielded impeller obtained with the invention from the front, FIG. 3 shows a detail of the shielded impeller obtained with the invention from the front, FIG. 4 shows a sectional view through the shielded impeller obtained with the invention in an alternative embodiment, with a material buildup between the inner surface of the shield ring and the radial widening, FIG. 5 shows another sectional view through the shielded impeller obtained with the invention, between two blades, FIG. 6 shows a sectional view along the back edge of a blade.

The shielded impeller 1 shown in FIGS. 1 to 6 is formed by a hub 2 and blades 3, as well as a shield ring 4 surrounding the ends of the blades 3 and encircling the shielded impeller 1. When the shielded impeller 1 rotates about an axis 5 in the direction 6, an air flow 8 is created by the shielded impeller 1.

The shield ring 4 has a front edge 9 and a back edge 7, and the blades 3 each have a front edge 10 and a back edge 11.

The shield ring 4 is cylindrical at the front edge 9, and can therefore be placed in an intake nozzle 12 for a fan 13, which is merely indicated in FIG. 1. The individual blades 3 have intake surface 14 and an exhaust surface 15.

The shielded impeller 1 has radial widenings 16 on its back edge 7, which improve the aerodynamics thereof, and increase the flow volume, therefore resulting in greater efficiency. The shield ring 4 is therefore widened at these radial widenings 16 in the direction of the air flow.

In order to produce the shielded impeller 1 easily and inexpensively with a plastic injection molding process, the radial widenings 16 are only formed between the back edges 11 of adjacent pairs of blades over the circumference 17. There is a point 18 at each back edge 11 where there is no radial widening 16, such that the back edge 7 has the same radius as the front edge 9 at these points 18, as can be seen clearly in FIG. 6. At this point 18, the shield ring 4 is indented, due to the absence of the radial widening 16. The transition from the radial widening 16 to this point 18 or back is smooth, without abrupt bends or creases. The outer radius of the back edge 7 of the shield ring 4 for the shielded impeller 16 obtained with the invention varies over the circumference 17, and is greater at the radial widenings 16 that at the points 18 where the outer radius corresponds to that of the front edge 9. At the radial widenings 16, the shield ring 4 has an outer diameter at the back edge 7 that is greater than the outer diameter at the front edge 9 of the shield ring 4, while at the points 18 where there is no radial widening 16, it has an outer diameter at the back edge 7 that corresponds to the outer diameter of the front edge 9 of the shield ring 4.

The individual blades 3 are connected to the shield ring 4 at both their front edges 10 and their back edges 11, and the shield ring 4 is cylindrical where it comes in contact with the front edges 10 and the back edges 11, such that the outer radius of the front edge 9 of the shield ring 4 is basically the same as the outer radius of the back edge 7 at these points 18.

When looking at the widenings 16 shown in FIGS. 4-6, it is clear that they extend over no more than 50% of the axial thickness H of the shielded impeller 1 obtained with the invention. The front 50% of the shield ring 4 has a constant diameter, and is therefore cylindrical, and can be inserted in the intake nozzle 12.

The hub 2 in the shielded impeller 1 is cup-shaped, with a base 19 and a wall 20 ending in a rim 21. This has the advantage that the hub 2 can be formed with relatively little material and is therefore not only light, but can be produced ecologically and economically. Reinforcement structures 23 can be formed on the inner surface of the hub 2, i.e. on the inner surface of the hub wall 20, which are parallel to the axis 5 thereof, starting at the base 19 and tapering along the wall 20 toward the rim 21, as can be seen in FIGS. 4-6. These reinforcement structures 23 further reduce the amount of material forming the hub 2, resulting in a lighter shielded impeller 1, which is formed with less material and is therefore less expensive to produce, and also requires smaller, lighter bearings.

FIGS. 4 and 6 show that the inner surface 24 of the shield ring 4 is cylindrical on the intake side 14 of the blades 3, and widens on the exhaust side 15 (see FIG. 5) in the direction of the air flow 8 at the radial widening 16. This shielded impeller 1 could theoretically also be produced with an injection molding tool without slides, if the region 25 between the inner surface 24 and the widening 16 is big enough, as shown in FIG. 4. This design results in material buildup in this region 25, making the shielded impeller 1 not only heavy, but also requiring more material. Although production of such a shielded impeller 1 would be possible within the framework of the invention, it is less than preferable.

In general, the shielded impeller 1 can be produced through injection molding in a plastic injection molding tool without slides, while theoretically it could also be produced with a die-casting process in an injection molding tool without slides. In this case, aluminum could be used. The shielded impeller 1 obtained with the invention could also be produced with a ceramic injection molding process in a tool without slides. Making the shielded impeller 1 from plastic has the advantage that it is not only light, but can also be produced inexpensively. A light shielded impeller 1 results in a lighter fan 13, and requires smaller, lighter, and less expensive bearings for the rotor 1.

On the whole, because of the special shape of the shield ring 4 for the shielded impeller 1, it can be produced with an injection molding tool without slides, which is significantly less expensive than using a tool that has slides, because the tool is less expensive and more durable. Furthermore, injection molding tools without slides have a quicker output rate.

As a result of the thinner regions at the points 18 between the widenings 16, there are aerodynamic advantages, despite the widenings 16, such as a high flow volume and the associated higher efficiency.

The subject specification can be readily understood with reference to the following Numbered Paragraphs:

Numbered Paragraph 1. A method for the production of a shielded impeller (1),
wherein the shielded impeller (1) contains blades (3) extending from a hub (2) and a shield ring (4) encompassing the ends of the blades (3) that rotates with the shielded impeller (1),
wherein the shield ring (4) has radial widenings (16) on the back edge (7) and points (18) without radial widenings (16) wherein the shielded impeller (1) is produced in a plastic injection molding process.

Numbered Paragraph 2. The method according to Numbered Paragraph 1, characterized in that the shielded impeller (1) is produced with a plastic injection molding tool without slides.

Numbered Paragraph 3. A shielded impeller (1), produced with the method according to Numbered Paragraph 1 or 2.

Numbered Paragraph 4. The shielded impeller according to Numbered Paragraph 3, characterized in that the shield ring (4) is cylindrical at the front edge (9) of the shielded impeller (1).

Numbered Paragraph 5. The shielded impeller according to Numbered Paragraph 3 or 4, characterized in that the blades (3) are connected to the shield ring (4) at their front edges (10) and back edges (11), wherein the shield ring (4) is cylindrical where it comes in contact with the front edge (10) and the back edge (11).

Numbered Paragraph 6. The shielded impeller according to Numbered Paragraph 5, characterized in that there is a widening (16) along the circumference (17) of the back edge (7) of the shield ring (4) between the back edges (11) of each pair of adjacent blades (3).

Numbered Paragraph 7. The shielded impeller according to any of the Numbered Paragraphs 3 to 6, characterized in that the radial widenings (16) of the shield ring (4) extend over no more than 50% of the axial width (H) of the shielded impeller (1).

Numbered Paragraph 8. The shielded impeller according to any of the Numbered Paragraphs 3 to 7, characterized in that the hub (2) is cup-shaped.

Numbered Paragraph 9. The shielded impeller according to Numbered Paragraph 8, characterized in that reinforcement structures (23) are formed on the inner surface (22) of the cup-shaped hub (2), which taper over the hub wall (20) from the base (19) to the rim (21).

Numbered Paragraph 10. A fan (13), in particular a Visco fan in a motor vehicle, which has an intake nozzle (12) and at least one shielded impeller (1) according to any of the Numbered Paragraphs 3 to 9, wherein the front edge (9) of its shield ring (4) is placed in the intake nozzle (12).

The invention claimed is:

1. A method for the production of a shielded impeller, comprising:
a plurality of blades extending from a hub and a shield ring encompassing each end of each of the plurality of blades that rotates with the shielded impeller,
wherein the shield ring further comprises radial widenings on a back edge thereof and points without radial widenings,
wherein the shielded impeller is produced in a plastic injection molding process,
wherein the radial widenings of the shield ring extend over no more than 50% of an axial width (H) of the shielded impeller.

2. The method according to claim 1, wherein the shielded impeller is produced with a plastic injection molding tool without slides.

3. A shielded impeller, comprising:
a plurality of blades extending from a hub and a shield ring encompassing the ends each end of each of the plurality of blades that rotates with the shielded impeller,
wherein the shield ring further comprises radial widenings on a back edge thereof and points without radial widenings, and
wherein the radial widenings of the shield ring extend over no more than 50% of an axial width (H) of the shielded impeller.

4. The shielded impeller according to claim 3, wherein the shield ring is cylindrical at a front edge of the shielded impeller.

5. The shielded impeller according to claim 3, wherein the blades are connected to the shield ring at a front edge of the plurality of blades and a back edge of the plurality of blades, and wherein the shield ring is cylindrical.

6. The shielded impeller according to claim 5, wherein there is a widening along the circumference of the back edge of the shield ring between the back edges of each pair of adjacent blades of the plurality of blades.

7. The shielded impeller according to claim 3, wherein the hub is cup-shaped.

8. The shielded impeller according to claim 7, wherein reinforcement structures are formed on the inner surface of the cup-shaped hub, which taper over a hub wall from a base to a rim.

9. A fan comprising an intake nozzle and at least one shielded impeller according to claim 3.

10. The fan according to claim 9, wherein the fan is a Visco fan.

* * * * *